United States Patent [19]

Ikeno et al.

[11] Patent Number: 5,279,890
[45] Date of Patent: Jan. 18, 1994

[54] SILICONE COMPOSITE PRODUCT AND PROCESS FOR PREPARING THE SAME

[75] Inventors: Masayuki Ikeno, Annaka; Hironao Fujiki, Takasaki, both of Japan

[73] Assignee: Shin-Etsu Chemical Co., Ltd., Tokyo, Japan

[21] Appl. No.: 623,681

[22] Filed: Dec. 6, 1990

[30] Foreign Application Priority Data

Dec. 7, 1989 [JP] Japan ................... 1-318627

[51] Int. Cl.$^5$ .......................... B29C 39/12; B32B 7/02
[52] U.S. Cl. ....................... 428/217; 427/387; 428/447
[58] Field of Search ............... 428/217, 447; 427/387

[56] References Cited

U.S. PATENT DOCUMENTS

| | | | |
|---|---|---|---|
| 4,163,082 | 7/1979 | Romenesko | 428/447 |
| 4,455,691 | 6/1984 | Van Aken Redinger et al. | 428/447 |
| 4,511,620 | 4/1985 | Kroupa et al. | 428/220 |
| 4,517,238 | 5/1985 | Mine et al. | 428/212 |
| 4,528,243 | 7/1985 | Kookootsedes | 428/425.5 |
| 4,780,260 | 10/1988 | Yoshida et al. | 264/255 |

FOREIGN PATENT DOCUMENTS 2045824 11/1980 United Kingdom .

OTHER PUBLICATIONS

Questel Telesystems (WPIL), accession No. 88-081858 [12], Derwent Publications Ltd., London, GB; and JP-A-63 035 655 (Toshiba Silicone K.K.) Feb. 16, 1988.

*Primary Examiner*—Paul J. Thibodeau
*Assistant Examiner*—D. S. Nakarani
*Attorney, Agent, or Firm*—Oblon, Spivak, McClelland, Maier & Neustadt

[57] ABSTRACT

The silicone composite product comprises a silicone gel obtained by curing a specified addition-curable type organopolysiloxane composition, and an elastomer layer or resin layer formed on the silicone gel by use of an organopolysiloxane having Si-bonded alkenyl groups and Si-bonded hydrogen atoms. The silicone composite product has the elastomer layer or resin layer formed integrally with the silicone gel phase, whereby such problems as adhesion of dust or refuse to the surface of the silicone gel, etc. can be solved effectively.

8 Claims, No Drawings

SILICONE COMPOSITE PRODUCT AND PROCESS FOR PREPARING THE SAME

BACKGROUND OF THE INVENTION

1. Field of the Invention

The present invention relates to a silicone composite product of which the inside part comprises a silicone gel and the surface layer comprises a silicone elastomer or silicone resin, and to a process for preparing the silicone composite product.

2. Description of the Prior Art

Cured silicone products extremely low in hardness and penetration as compared with elastomer are called "silicone gels" in the field of art. The silicone gels, because of their excellent electrically insulating properties and stability of electrical properties as well as excellent pliability, are used for potting or sealing of electric and electronic parts, especially as a coating material for covering control circuit components, such as power transistors, integrated circuits, capacitors, etc. to protect these components against thermal or mechanical disorder or malfunction. However, the surface of a silicone gel is so tacky as to permit easy adhesion of refuse or dust thereto and to cause such a workability problem that molded products cannot be superposed on the silicone gel. Furthermore, the silicone gel is unsatisfactory in mechanical strength, and may be broken or damaged in an operation for removal of the dust or the like adhered thereto.

As a method of improving the above-mentioned drawbacks of the silicone gels, there have been known, for example:

(i) a method in which a silicone gel is protected by a casing, a cover or the like formed of an organic material, thereby preventing the adhesion of refuse, dust, etc. on the silicone gel and achieve mechanical protection of the silicone gel;

(ii) a method in which a protective layer of other organic high-hardness resin is provided on a silicone gel;

(iii) a method which, as disclosed in Japanese Patent Publication (KOKOKU) No. 1-25704 (1989), comprises the steps of applying an organohydrogenpolysiloxane or the like to a silicone gel, and diffusing the organohydrogenpolysiloxane or the like into the surface of the silicone gel, followed by heating to cure the organohydrogenpolysiloxane or the like, thereby forming a silicone elastomer or silicone resin layer; and (iv) a method in which, as disclosed in Japanese Preexamination Patent Publication (KOKAI) No. 61-277414 (1986), an organohydrogenpolysiloxane is applied to an uncured silicone gel composition, and, before diffusion occurs, heating is carried out to simultaneously cure both the inside silicone gel composition and the surface layer in which the organohydrogenpolysiloxane has been incorporated, whereby a silicone elastomer layer is formed on the surface of the silicone gel.

However, the method (i) above involves such problems as unsatisfactory adhesion between the silicone gel and the casing, due to rising of the gel into corners of the casing.

Also, the method (ii) has the problem of separation between layers being liable to occur because of insufficient adhesion between the layers.

In the method (iii), the kind and amount of the organohydrogenpolysiloxane having functional groups capable of reacting with the residual functional groups in the silicone gel must be so selected that the organohydrogenpolysiloxane will not remain uncured on the surface of the silicone gel, or there is need for cleaning or wiping after the cure.

According to the method (iv), the silicone gel composition is still in an uncured state when heating is conducted. Therefore, the organohydrogenpolysiloxane applied to the surface of the silicone gel composition is taken into the composition under the effect of convection. As a result, the surface layer may be cured nonuniformly or it may be impossible to obtain a favorable protective layer.

SUMMARY OF THE INVENTION

The present invention contemplates a solution to the above-mentioned problems involved in the prior art.

Accordingly, it is an object of the invention to provide a silicone composite product which comprises a silicone gel obtained by curing a specified addition-curing type silicone composition and a silicone elastomer layer or silicone resin layer formed integrally with the silicone gel, and a process for preparing the silicone composite product.

According to the present invention, there is provided a silicone composite product which comprises (A) a silicone gel phase having a rubber hardness of 0, and (B) a cured silicone layer having a rubber hardness of greater than 0 formed on the silicone gel phase, the silicone gel phase (A) being a cured product of a curable organopolysiloxane composition comprising:

(a-1) an organopolysiloxane having an average of 0.1 to 2.0 Si-bonded alkenyl groups per one molecule thereof, with the remaining Si-bonded organic groups being monovalent hydrocarbon groups of up to 12 carbon atoms, and a viscosity of 50 to 100,000 cP at 25° C., (a-2) an organohydrogenpolysiloxane having an average of 2 or more Si-bonded hydrogen atoms per one molecule thereof, and present in such an amount that the number of the Si-bonded hydrogen atoms is 0.3 to 2.0 per one Si-bonded alkenyl group in the organopolysiloxane (a-1), and (a-3) a catalytic amount of a catalyst for addition reaction, and the cured silicone layer being a cured product of:

(b) an organopolysiloxane having Si-bonded alkenyl groups and Si-bonded hydrogen atoms, the Si-bonded alkenyl groups and the Si-bonded hydrogen atoms being contained in respective amounts of an average of 0.1 to 8.0 mol % based on the total amount of the Si-bonded monovalent groups and atoms.

The silicone composite product may be prepared by curing the addition-curing type organohydrogenpolysiloxane composition containing the components (a-1) to (a-3) as mentioned above to prepare the above silicone gel (A), then applying the organopolysiloxane of component (b) to the surface layer of the silicone gel, and curing the surface layer.

The term "silicone gel" used herein means a cured silicone product having a rubber hardness, as specified in JIS K-6301 and measured on a Type A spring hardness tester, of 0. Such a silicone gel, generally, has a three-dimensional network structure with a low degree of crosslinking, and is deformed so as to absorb vibration or exhibits fluidity (flowing property) under stress.

Also, the silicone gels generally has a penetration, as specified in ASTM D-1403 (¼ cone), of more than 0. On the other hand, the cured silicone having a rubber hardness of greater than 0 as mentioned above is a cured silicone product being in an elastomeric or resinous state. The silicone elastomers and silicone resins have a three-dimensional network structure with a high degree of crosslinking, and does not exhibit fluidity (flowing property) even under stress. In the present invention as mentioned above, generally, the cured silicone layer of (B) is in an elastomeric state when the component (b) contains the Si-bonded alkenyl groups and the Si-bonded hydrogen atoms in respective amounts of 0.1 to 6 mol % per one molecule thereof, and in a resinous state when the respective amounts are 6 to 8 mol %.

According to the present invention as aforementioned, the surface of the silicone gel phase constituting the silicone composite product is protected by the elastomer or resin layer formed in one body therewith, whereby the problem of adhesion of refuse or dust to the surface and the mechanical strength problem are solved effectively.

DETAILED DESCRIPTION OF THE INVENTION

(A) Silicone Gel Product

The silicone gel product in the silicone composite product of the present invention is obtained by curing an addition-curing type organopolysiloxane composition which contains the following components (a-1) to (a-3) as essential constituents.

(a-1) Organopolysiloxane:

The organopolysiloxane is one that has an average of 0.1 to 2.0, preferably 0.4 to 2.0, Si-bonded alkenyl groups per one molecule thereof. If the amount (number) of the alkenyl groups is less than 0.1, it is difficult to obtain the silicone gel, whereas if the amount is more than 2.0, the hardness after cure is so high that the silicone gel cannot be obtained.

As the alkenyl groups, for example, vinyl, allyl, isopropenyl, cyclohexeny, etc. can be included, of which preferred is the vinyl group in view of easy synthesis of the organopolysiloxane and a wide variety of catalysts capable of being used to cure easily the organopolysiloxane composition obtained.

As organic groups other than the alkenyl groups which are bonded to the silicon atoms, there can be included, for example, monovalent hydrocarbon groups of up to 12, preferably up to 8, carbon atoms which contain no aliphatic unsaturated bonds, e.g., alkyl groups such as methyl, ethyl, propyl, butyl, pentyl, hexyl, octyl, decyl, dodecyl, etc., aralkyl groups such as 2-phenylethyl, 2-phenylpropyl, etc., aryl groups such as phenyl, etc., and 3,3,3-trifluoropropyl, etc., the methyl group being preferred in view of easy synthesis of the organopolysiloxane and the heat resistance and physical properties of the silicone gel product obtained.

Besides, the organopolysiloxane may be either straight-chain or branched in form. A mixture of the two types may also be used.

Furthermore, the viscosity at 25° C. of the organopolysiloxane (a-1) should be in the range from 50 to 100,000 cP, preferably from 100 to 10,000 cP. If the viscosity is below 50 cP, the resulting organopolysiloxane composition tends to flow easily, and the physical properties after reaction are unsatisfactory. On the other hand, a viscosity in excess of 100,000 cP leads to poor workability.

(a-2) Organohydrogenpolysiloxane:

The organohydrogenpolysiloxane (a-2) used in the present invention is to form a silicone gel by reacting with the alkenyl groups in the component (a-1). For this purpose, the organohydrogenpolysiloxane (a-2) should have an average of 2 or more Si-bonded hydrogen atoms per one molecule thereof. Such hydrogen atoms may be bonded to either the silicon atoms at the ends of the molecule of the organohydrogenpolysiloxane or the silicon atoms at intermediate points in the molecule.

Organic groups bonded to the silicon atoms of the organohydrogenpolysiloxane (a-2) may include the same or similar organic groups to those mentioned above as other groups than the alkenyl groups bonded to the silicon atoms in the organopolysiloxane (a-1). Among these organic groups, the methyl group is preferred in view of easy synthesis of the organohydrogenpolysiloxane and good heat resistance of the silicone gel product obtained. The siloxane skeleton may be either straight-chain or branched in form. For easy synthesis, a straight-chain siloxane skeleton is preferred. The viscosity of the organohydrogenpolysiloxane (a-2) is not particularly limited. From the viewpoint of easy synthesis and workability, however, the viscosity is preferably in the range from 10 to 1,000 cP (at 25° C.).

The organohydrogenpolysiloxane is used in such an amount that the amount (number) of the Si-bonded hydrogen atoms in the component (a-2) is from 0.3 to 2.0, preferably from 0.5 to 1.5, per one Si-bonded alkenyl group in the component (a-1). If the amount (number) of the Si-bonded hydrogen atoms is less than 0.3, the resulting silicone gel product shows poor heat resistance due to the residual alkenyl groups therein, whereas if the amount (number) of the hydrogen atoms is more than 2, there is the possibility of foaming.

(a-3) Catalyst for addition reaction:

The catalyst for addition reaction to be used in the present invention may be any catalyst which accelerates the addition reaction between the alkenyl groups in the component (a-1) and the hydrosilyl groups in the component (a-2). Generally, platinum family metal catalysts are used, for example, platinum catalysts such as chloroplatinic acid, alcohol-modified chloroplatinic acid, a complex of chloroplatinic acid and vinylsiloxane, etc., palladium catalysts such as tetrakis(triphenylphosphine)palladium, a mixture of palladium black and triphenylphosphine, etc., rhodium catalysts, and so on.

The addition reaction catalyst (a-3) may be used in the so-called "catalytic amount" of the catalyst, which generally ranges from 0.1 to 100 ppm, as the catalyst metal element, based on the total amount of the components (a-1) and (a-2).

Other compounding agents:

If necessary, the addition-curing type organopolysiloxane composition used for formation of the silicone gel product (A) in the present invention may further contain, in addition to the above-mentioned components (a-1) to (a-3), a variety of compounding agents which are known per se. For instance, inorganic fillers such as fumed silica, precipitated silica, pulverized quartz, diatomaceous earth, iron oxide, titanium oxide, calcium carbonate, etc., reaction inhibitors such as benzotriazole, etc., flame-retardants such as manganese carbonate, carbon black, etc., heat-resisting stabilizer, oil-resisting stabilizer, coloring agents such as dyes, pigments, etc. may be incorporated in the composition, as required. Furthermore, hollow particles of silica, organic polymeric fillers containing a low boiling point compound therein, a powder of foams (e.g., silicone foams), etc. may be incorporated in the composition to enhance the vibration-absorbing properties of the resulting silicone gel product (A).

(B) Cured Silicone Layer With High Hardness

According to the present invention, on the surface of the silicone gel phase of the organopolysiloxane composition containing the components (a-1) to (a-3) as mentioned above, a cured silicone layer, namely, an elastomer or resin layer consisting of a cured product of the following organopolysiloxane (b) is formed.

(b) Organopolysiloxane:

The organopolysiloxane (b) has Si-bonded alkenyl groups and Si-bonded hydrogen atoms in respective amounts of 0.1 to 8.0 mol % based on the total amount of the Si-bonded monovalent groups and atoms, and will cure by itself to form a network structure. Therefore, the amounts of these functional groups can be varied appropriately within the above-mentioned range, according to the degree of crosslinking of the elastomer or resin layer which serves as a surface protective layer. These functional groups, namely, the alkenyl groups and hydrogen atoms, may be bonded either to the silicon atoms at intermediate points in the molecule of the organopolysiloxane (b) or to the silicon atoms at the ends of the molecule. As the alkenyl groups, for example, vinyl, allyl, etc. can be included, of which preferred is the vinyl group in view of easy synthesis of the organopolysiloxane (b) and a wide variety of catalysts capable of being used to cure easily the organopolysiloxane (b). As organic groups other than the alkenyl groups which are bonded to the silicon atoms, there can be included, for example, monovalent hydrocarbon groups of up to 12, preferably up to 8, carbon atoms which contain no aliphatic unsaturated bonds, e.g., alkyl groups such as methyl, ethyl, propyl, butyl, pentyl, hexyl, octyl, decyl, dodecyl, etc., aralkyl groups such as 2-phenylethyl, 2-phenylpropyl, etc., aryl groups such as phenyl, etc., and 3,3,3-trifluoropropyl, etc., the methyl group being preferred in view of easy synthesis of the organopolysiloxane and the heat resistance and physical properties of the cured silicone layer obtained. The siloxane skeleton may be either straight-chain or branched in form. A mixture of the two types may also be used.

To form the elastomer layer, in general, an organopolysiloxane having Si-bonded alkenyl groups and Si-bonded hydrogen atoms in respective amounts, per one molecule, of 0.1 to 6 mol % based on the total amount of Si-bonded monovalent groups and atoms is used. To form the resin layer, on the other hand, an organopolysiloxane having in which the above respective amounts per one molecule are each 6 to 8 mol % is used.

For diffusion of part of the organopolysiloxane (b) into the surface of the above-mentioned cured silicone phase (A), it is desirable that the viscosity of the organopolysiloxane (b) be as low as possible, with a generally preferable viscosity at 25° C. being 200 cP or below.

If necessary, the organopolysiloxane (b) may be used in combination with various compounding agents such as inorganic filler, etc., as in the case of the silicone gel phase (A). In some situations, catalysts for addition reaction similar to those used for the component (a-3) may also be used together.

PREPARATION OF COMPOSITE PRODUCT

The silicone composite product of this invention is prepared by curing the addition-curing type organopolysiloxane composition containing the components (a-1) to (a-3) as mentioned above to form a silicone gel phase (A), and forming a cured silicone layer (B) on the surface of the silicone gel phase (A).

The formation of the silicone gel phase (A) may be carried out by the conventionally known methods, for example, a method in which the above-mentioned addition-curing type organopolysiloxane composition is poured into a suitable mold and then cured or a method in which the composition is applied to a suitable substrate and then cured. The curing can be carried out easily by a heating treatment at a temperature of generally 60° to 150° C. for about 180 to 30 minutes, whereby the silicone gel phase (A) can be formed easily.

In the present invention, the elastomeric or resinous cured silicone layer (B) is formed by applying the organopolysiloxane (b) to the silicone gel phase (A) and curing the organopolysiloxane (b).

The application of the organopolysiloxane (b) can be carried out by any of a coating method using a brush, sponge, etc., a spraying method, a coating method by evaporating the organopolysiloxane, a method of injecting the organopolysiloxane into the silicone gel surface layer by a syringe, etc., and a method in which the silicone gel produce (A) is dipped in a liquid matter of the component (b). The curing of the organopolysiloxane (b) applied to the entire surface of the silicone gel product (A) can be achieved easily by a heating treatment at a temperature of generally 60° to 150° C. for about 180 to 30 minutes, though the temperature and time values depend on the alkenyl group content, the hydrogen content, etc. Where heating is difficult to carry out, the curing can be performed at normal temperature by jointly using an addition reaction catalyst similar to that for the component (a-3), as has been mentioned above.

It is recommendable that the amount of the organopolysiloxane (b) applied to the silicone gel product (A) be in the range from 0.0005 to 0.2 g, preferably from 0.001 to 0.1 g, per 1 $cm^2$ of surface area of the silicone gel product.

In this manner, the silicone gel product (A) is coated with the elastomeric or resinous cured silicone layer (B) consisting of the cured product of the organopolysiloxane (b). Further, part of the organopolysiloxane (b) permeates into the silicone gel (A) and reacts with the residual crosslinking points (the alkenyl groups or hydrogen atoms in the components (a-1) and (a-2)), whereby the layer (B) is formed in one body with the silicone gel product (A).

USE

The silicone composite product of the present invention as described above is suitable for being formed on the surfaces of a variety of electric or electronic parts, semiconductor devices, etc., whereby effective coating or sealing of the parts, devices, etc. can be achieved. The surface of the article on which to form the silicone composite product may be formed of any of such materials as plastics, metals, glasses, etc.

When the organopolysiloxane (b) is applied to the surface of the silicone gel, it is normally allowed to partially diffuse into the surface layer of the silicone gel. Since the diffused portion of the organopolysiloxane (b)

is cured as such, there may normally exist an interlayer composed of a cured product of the silicone gel and the organopolysiloxane diffused therein, between the silicone gel phase (A) and the cured silicone layer (B).

EXAMPLES

The present invention will be illustrated by the following examples, in which Me and Vi represent the methyl group and the vinyl group, respectively, and all the values of viscosity are values at 25° C.

Example 1

To a mixture of 100 parts of a dimethylpolysiloxane represented by the average formula:

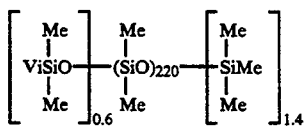

with a viscosity of 800 cP and 0.7 part of a polymethylhydrogensiloxane represented by the average formula:

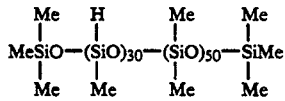

with a viscosity of 100 cP was added a 2-ethylhexanol solution of chloroplatinic acid in an amount of 5 ppm, calculated as platinum, based on the total amount of the polysiloxanes, followed by mixing uniformly to prepare a curable organopolysiloxane composition. The composition was cured by heating at 150° C. for 30 minutes, to be a silicone gel product with a rubber hardness of 0 (JIS K-6301, Type A) and a penetration of 80 (ASTM D 1403).

To a 5 cm$^2$ surface area of the cured gel product, 0.5 g of a dimethylpolysiloxane represented by the average formula:

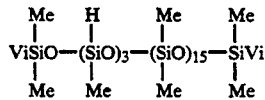

with a viscosity of 20 cP was applied by use of a sponge impregnated with the dimethylpolysiloxane, followed by heating at 150° C. for 30 minutes, to obtain a silicone composite product. The surface of the composite product thus obtained was elastomeric and insusceptible to adhesion of dust thereto, whereas the inside part was in a gel state.

EXAMPLE 2

To a 5 cm$^2$ surface area of the cured gel product of the curable organopolysiloxane composition prepared in Example 1, 0.5 g of a dimethylpolysiloxane represented by the average formula:

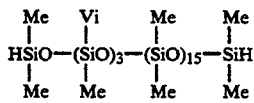

with a viscosity of 20 cP was applied by use of a sponge impregnated with the dimethylpolysiloxane, followed by heating at 150° C. for 30 minutes, to obtain a silicone composite product. The composite product thus obtained had an elastomer layer formed thereon, to which dust would hardly be adhered, and the inside part was in a gel state.

Example 3

To a mixture of 100 parts of a dimethylpolysiloxane represented by the average formula:

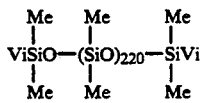

with a viscosity of 1000 cP and 2.3 parts of a polymethylhydrogensiloxane represented by the average formula:

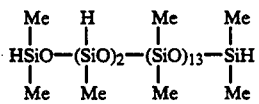

with a viscosity of 20 cP was added a 2-ethylhexanol solution of chloroplatinic acid in an amount of 5 ppm, calculated as platinum, based on the total amount of the polysiloxanes, followed by mixing uniformly to prepare a curable organopolysiloxane composition. The composition was cured by heating at 150° C. for 30 minutes, to be a silicone gel product with a rubber hardness of 0 (JIS K-6301, Type A) and a penetration of 50 (ASTM D 1403).

To a 5 cm$^2$ surface area of the cured gel product thus obtained, 0.5 g of a dimethylpolysiloxane, component (D), represented by the average formula:

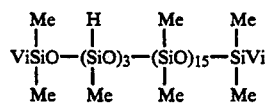

was use of a sponge impregnated with the dimethylpolysiloxane, followed by heating at 150° C. for 30 minutes to obtain a silicone composite product. The surface of the composite product thus obtained was elastomeric and insusceptible to adhesion of dust thereto, whereas the inside part was in a gel state.

Example 4

To the surface of the cured product (silicone gel) of the curable organopolysiloxane composition prepared in Example 3, 2 g of a dimethylpolysiloxane represented by the average formula:

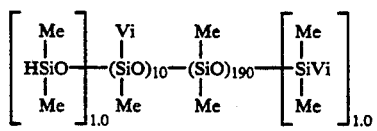

with a viscosity of 700 cP was applied in a thickness of 0.5 mm, followed by heating at 150° C. for 30 minutes, to obtain a silicone composite product. The composite product thus obtained had an elastomeric surface, to which dust would hardly be adhered, whereas the inside part was in a gel state.

Example 5

The curable organopolysiloxane composition prepared in Example 3 was cured by dropping into hot water which contained 1% of a surface active agent (trade name: TERGITOL TMN-6, a nonionic surface active agent produced by Union Carbide Corp.) and was agitated at a temperature of 85° C. The cured product was a spherical silicone gel product with a tacky surface. The cured silicone product thus obtained was dipped in an aqueous solution containing 15% of the component (D) used in Example 3 and 1% of the surface active agent (TERGITOL TMN-6) for 1 minute. The thus dipped body was taken out and cured by heating at 80° C. for 30 minutes, to obtain a silicone composite product, which had an elastomeric surface and an inside part in a gel state.

We claim:

1. A silicone composite product which comprises (A) a silicone gel phase having a rubber hardness of 0, and (B) a cured silicone layer having a rubber hardness of greater than 0 integrally formed on the silicone gel phase, the silicone gel phase (A) being a cured product of a curable organopolysiloxane composition comprising:
(a-1) an organopolysiloxane having an average of 0.1 to 2.0 Si-bonded alkenyl groups per one molecule thereof, with the remaining Si-bonded organic groups being monovalent hydrocarbon groups of up to 12 carbon atoms, and a viscosity of 50 to 100,000 cP at 25° C.,
(a-2) an organohydrogenpolysiloxane having an average of 2 or more Si-bonded hydrogen atoms per one molecule thereof, and present in such an amount that the number of the Si-bonded hydrogen atoms is 0.3 to 2.0 per one Si-bonded alkenyl group in the organopolysiloxane (a-1), and
(a-3) a catalytic amount of a catalyst for addition reaction, and (B) the cured silicone layer being a cured product of
(b) an organopolysiloxane having Si-bonded alkenyl groups and Si-bonded hydrogen atoms, the Si-bonded alkenyl groups and the Si-bonded hydrogen atoms being contained in respective amounts of an average of 0.1 to 8.0 mol % based on the total amount of the Si-bonded monovalent groups and atoms.

2. A silicone composite product according to claim 1, wherein the organopolysiloxane (a-1) contains vinyl groups as alkenyl groups.

3. A silicone composite product according to claim 1, wherein the organopolysiloxane (a-1) contains an average of 0.4 to 2.0 alkenyl groups per one molecule thereof.

4. A silicone composite product according to claim 1, wherein the organopolysiloxane (b) contains vinyl groups as alkenyl groups.

5. A silicone composite product according to claim 1, wherein the organopolysiloxane (b) has a viscosity of not more than 200 cP at 25° C.

6. A silicone composite product according to claim 1, wherein the organopolysiloxane (b) contains the Si-bonded alkenyl groups and the Si-bonded hydrogen atoms in respective amounts of 0.1 to 6 mol % based on the total amount of the Si-bonded monovalent groups and atoms.

7. A process for producing the silicone composite product as set forth in claim 1, which comprises the steps of curing a curable organopolysiloxane composition comprising
(a-1) an organopolysiloxane having an average of 0.1 to 2.0 Si-bonded alkenyl groups per one molecule thereof, with the remaining Si-bonded organic groups being monovalent hydrocarbon groups of up to 12 carbon atoms, and a viscosity of 50 to 100,000 cP at 25° C.,
(a-2) an organohydrogenpolysiloxane having an average of 2 or more Si-bonded hydrogen atoms per one molecule thereof, and present in such an amount that the number of the Si-bonded hydrogen atoms is 0.3 to 2.0 per one Si-bonded alkenyl group in the organopolysiloxane (a-1), and
(a-3) a catalytic amount of a catalyst for addition reaction, to prepare said silicone gel (A) with a rubber hardness of 0, applying
(b) an organopolysiloxane having Si-bonded alkenyl groups and Si-bonded hydrogen atoms; the Si-bonded alkenyl groups and the Si-bonded hydrogen atoms being contained in respective amounts of an average of 0.1 to 8.0 mol % based on the total amount of the Si-bonded monovalent groups and atoms;
to the surface of the silicone gel, and
then curing the organopolysiloxane (b) to thereby form said cured silicone layer (B) with a rubber hardness of greater than 0 on the silicone gel (A).

8. A process according to claim 7, wherein the organopolysiloxane (b) is applied to the surface of the silicone gel (A) in an amount of 0.0005 to 2 g per 1 cm$^2$ of surface area of the silicone gel (A).

* * * * *